(12) United States Patent
Yokoyama et al.

(10) Patent No.: US 6,519,358 B1
(45) Date of Patent: Feb. 11, 2003

(54) PARALLAX CALCULATING APPARATUS, DISTANCE CALCULATING APPARATUS, METHODS OF THE SAME, AND INFORMATION PROVIDING MEDIA

(75) Inventors: Atsushi Yokoyama, Kanagawa (JP); Yoko Miwa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/168,055

(22) Filed: Oct. 7, 1998

(51) Int. Cl.$^7$ ................................................ G06T 17/00

(52) U.S. Cl. ........................................................ 382/154

(58) Field of Search ....................... 382/154; 250/559.23, 250/559.31; 345/422; 348/47, 49, 50; 356/375, 376; 702/152, 172

(56) References Cited

U.S. PATENT DOCUMENTS

| | | | |
|---|---|---|---|
| 5,309,522 A | * 5/1994 | Dye | ............................. 382/41 |
| 5,719,954 A | * 2/1998 | Onda | ........................... 382/154 |
| 5,768,404 A | * 6/1998 | Morimura et al. | ........... 382/107 |

OTHER PUBLICATIONS

T. Kanade et al., "A Video–Rate Stereo Machine," Carnegie Metlon University Robotics Institute, Japan Defuse Agency, Technical Research and Development Institute, JRSJ vol. 13, No. 3, Feb. 15, 1995, pp. 322–326.

* cited by examiner

*Primary Examiner*—Brian Werner
(74) *Attorney, Agent, or Firm*—Bell, Boyd & Lloyd LLC

(57) ABSTRACT

An apparatuses and methods for correcting parallax information between pixels obtained by stereo image processing to more reliable values, wherein first a first parallax is calculated by establishing correspondence between pixels of a standard picture and pixels of a reference picture by an area base matching method using a predetermined evaluation function, a detected corresponding point is evaluated to be correct when the value of the evaluation function indicates a high correlation and then the calculated first parallax is used as it is, while when the value of the evaluation function shows a low correlation, the detected corresponding point is evaluated to be unreliable, the pixel exhibiting the highest correlation is found based on the value of the evaluation function between pixels contained in a predetermined pixel block having the pixel having the unreliable correspondence as a center pixel and the corresponding points, then the first parallax is replaced with the parallax of the found pixel for the correction.

49 Claims, 6 Drawing Sheets

PICTURE OF CAMERA A         PICTURE OF CAMERA B

PARALLAX CALCULATING APPARATUS, DISTANCE CALCULATING APPARATUS, METHODS OF THE SAME, AND INFORMATION PROVIDING MEDIA

BACKGROUND OF THE INVENTION

1. Field of the Invention

The present invention relates to a parallax calculating apparatus and a distance calculating apparatus (so-called stereo image processing apparatus) which use two or more cameras to take a standard picture and a reference picture of an identical object, establish correspondence between pixels of these pictures, and find for each pixel a parallax of the two cameras with respect to the object from two cameras and a distance between the object and the two cameras, methods of the same, information providing media for providing processing of the same, and information providing media for providing the results of the processing.

2. Description of the Related Art

For example, the reference "Video-Rate Stereo Machine", Kanade and Kimura, *Journal of the Robotics Society of Japan (JRSJ)*, vol. 13, No. 3, pp. 322 to 326, 1995, discloses a so-called stereo image processing apparatus for obtaining parallax information between corresponding pixels between a plurality of pictures obtained by taking pictures of an identical object from two or more locations or taking pictures by two or more cameras and measuring a distance between points on an object or a shape of the object by the same.

When using a stereo image processing apparatus of the related art, however, establishment of correspondence of pixels between a plurality of pictures sometimes becomes inaccurate near the contours of the object depending on the positional relationship between the object and its background. Therefore, it is suffered that the parallax information between pixels and the distance and the shape of the object cannot be measured correctly.

SUMMARY OF THE INVENTION

An object of the present invention is to correct the parallax information between pixels obtained from a plurality of pictures of an object to more reliable values.

According to a first aspect of the present invention, there is provided a parallax calculating apparatus comprising a standard picture generating means for generating a standard picture taken of an object at a first view position; a reference picture generating means for generating a reference image taken of said object at a second view position; a detecting means for detecting a corresponding pixel of said reference picture corresponding to a pixel of said standard picture; a parallax calculating means for calculating parallax information between a pixel of said standard picture and a detected corresponding pixel; and a correcting means for correcting parallax information of a pixel to be corrected in a picture corresponding to the parallax information in response to the parallax information of another pixel.

According to a second aspect of the present invention, there is provided a parallax calculating method comprising a standard picture generating step for generating a standard picture taken of an object at a first view position; a reference picture generating step for generating a reference picture taken of said object at a second view position; a detecting step for detecting a corresponding pixel of said reference picture corresponding to a pixel of said standard picture; a parallax calculating step for calculating parallax information between a pixel of said standard picture and a detected corresponding pixel; and a correcting step for correcting parallax information of a pixel to be corrected in a picture given correspondence by the parallax information based on the parallax information of another pixel.

According to a third aspect of the present invention, there is provided an information provision medium providing a processing apparatus with control information having the parallax calculating method of the present invention.

According to a fourth aspect of the present invention, there is provided an information provision medium providing a processing apparatus with parallax information generated by the parallax calculating method of the present invention.

According to a fifth aspect of the present invention, there is provided a distance calculating apparatus comprising; a standard picture generating means for generating a standard picture taken of an object at a first view position; a reference picture generating means for generating a reference picture taken of said object at a second view position; a detecting means for detecting a corresponding pixel of said reference picture corresponding to a pixel of said standard picture; a distance calculating means for calculating distance information between a pixel of said standard picture and a detected corresponding pixel; and a correcting means for correcting distance information of a pixel to be corrected in a picture given correspondence by the distance information based on the distance information of another pixel.

According to a sixth aspect of the present invention, there is provided a distance calculating method comprising; a standard picture generating step for generating a standard picture taken of an object at a first view position; a reference picture generating step for generating a reference picture taken of said object at a second view position; a detecting step for detecting a corresponding pixel of said reference picture corresponding to a pixel of said standard picture; a distance calculating step for calculating distance information between a pixel of said standard picture and a detected corresponding pixel; and a correcting step for correcting distance information of a pixel to be corrected in a picture given correspondence by the distance information based on the distance information of another pixel.

According to a seventh aspect of the present invention, there is provided an information provision medium providing a processing apparatus with control information having the distance calculating method of the present invention.

According to an eighth aspect of the present invention, there is provided an information provision medium providing a processing apparatus with distance information generated by the distance calculating method of the present invention.

In the above aspects of the invention, preferably, the correcting means or step corrects the parallax or distance information at a pixel to be corrected based on parallax or distance information at a pixel positioned near the pixel to be corrected.

Preferably, the correcting means or step corrects the parallax or distance information at a pixel to be corrected by replacing it with parallax or distance information at another pixel.

Preferably, the detecting means or step detects a corresponding pixel using a predetermined evaluation function for a pixel value of a pixel of the standard picture and a pixel value of a pixel of the reference picture.

Preferably, the correcting means or step corrects the parallax or distance information at a pixel to be corrected based on parallax or distance information at another pixel in a predetermined region containing that pixel to be corrected.

More preferably the correcting means or step comprises a selecting means or step for selecting a pixel from the predetermined region based on accuracy of a relationship of correspondence between a pixel of the standard picture, corresponding to a pixel in the predetermined region, and a corresponding pixel of the reference picture and a parallax or distance correcting means or step for correcting the parallax or distance information of the pixel to be corrected based on the parallax or distance information at the pixel selected by the selecting means or step.

Still more preferably, the selecting means or step selects the pixel exhibiting the highest value, among the pixels found, of accuracy of correspondence between the pixel of the standard picture and the corresponding pixel of the reference picture, the pixel of the standard picture and the corresponding pixel of the reference picture being corresponding to the picture in the predetermined region, from the predetermined region.

Still more preferably the selecting means or step selects a pixel by searching through pixels positioned at the outermost circumference of the predetermined region.

Still more preferably the selecting means or step selects a pixel by searching through all pixels in the predetermined region.

Still more preferably the detecting means or step detects a corresponding pixel by using a predetermined evaluation function for a pixel value of a pixel of the standard picture and a pixel value of a pixel of the reference picture and the selecting means or step selects a pixel from the predetermined region by evaluating the accuracy of a relationship of correspondence between the pixel of the standard picture and the corresponding pixel of the reference picture based on the value of the predetermined evaluation function.

Still more preferably the detecting means or step detects a corresponding pixel by using a predetermined evaluation function for pixel values of pixels of the standard picture and pixel values of pixels of the reference picture in a range having a possibility of corresponding to the pixels of the standard picture and the selecting means or step selects a pixel from the predetermined region by evaluating the accuracy of correspondence between the pixel of the standard picture and the corresponding pixel of the reference picture based on the value of the predetermined evaluation function.

Still more preferably the detecting means or step detects a corresponding pixel by using a predetermined evaluation function for pixel values of pixels contained in pixel blocks having pixels of the standard picture as center pixels and pixel values of pixels contained in pixel blocks having as center pixels of the reference picture in a range having a possibility of corresponding to the pixels of the standard picture; the selecting means or step selects from that range the pixel, among those pixels, exhibiting the highest value of accuracy of correspondence between the pixel of the standard picture corresponding to the pixels and the corresponding pixel of the reference picture based on the values of the evaluation function at the pixels contained in the pixel block having the pixel to be corrected as a center pixel; and the parallax or distance correcting means or step corrects the parallax or distance information of the pixel to be corrected by replacing it by the parallax or distance information at the pixel selected by the selecting means or step.

According to a ninth aspect of the present invention, there is provided a distance calculating apparatus comprising; a standard picture generating means for generating a standard picture taken of an object; a reference picture generating means for generating a reference picture taken of said object; a detecting means for detecting a corresponding pixel of said reference picture corresponding to a pixel of said standard picture; a parallax calculating means for calculating parallax information between a pixel of said standard picture and a detected corresponding pixel; a correcting means for correcting parallax information of a pixel to be corrected in a picture given correspondence by the parallax information based on the parallax information of another pixel; and a distance calculating means for calculating a distance to the object based on the corrected parallax information.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, preferred embodiments of the present invention will be described with reference to the accompanying drawings.

Stereo Image Processing

For easier understanding of the embodiment of the present invention, a stereo image processing will be explained with reference to FIGS. 1A to 1C.

Figure 1A:
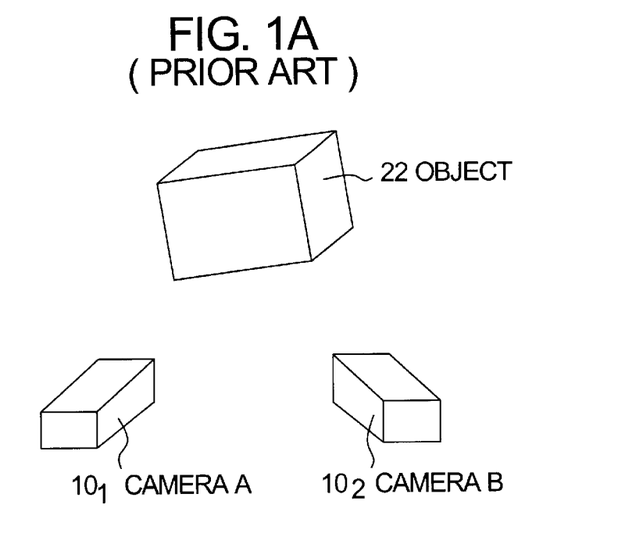
FIGS. 1A to 1C are views for explaining stereo image processing.
Figure 1B:
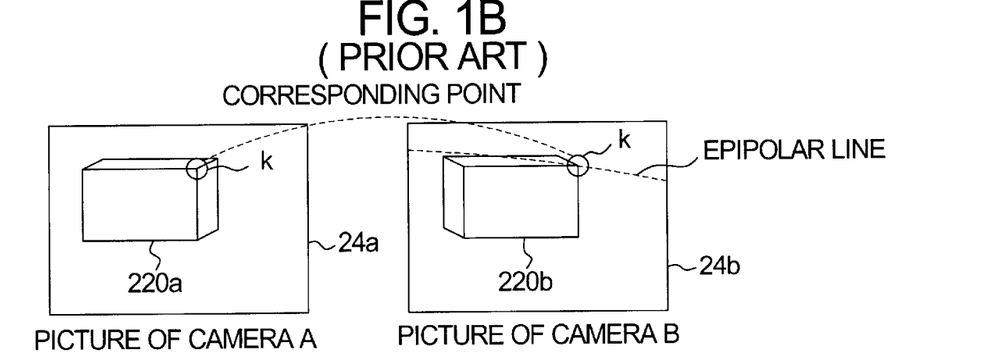
Figure 1C:
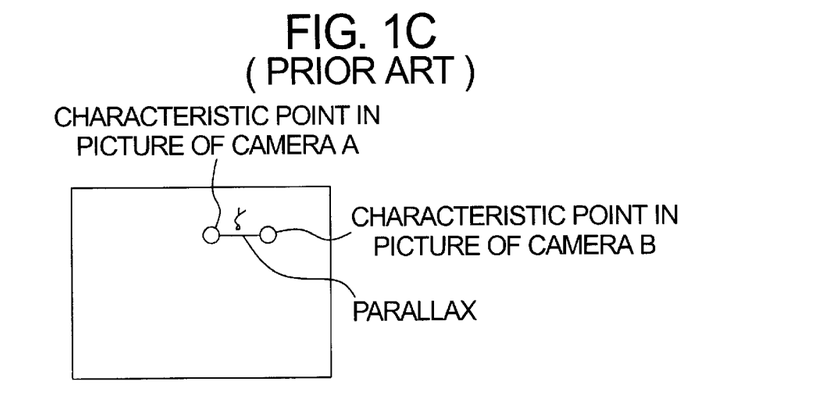

FIGS. 1A to 1C are views of stereo image processing.

As mentioned above, stereo image processing establishes correspondence between pixels between a plurality of pictures obtained by taking pictures of an identical object by cameras from two or more directions, converts parallax information between corresponding pixels to distance information from a camera to the object, and thereby measures both or either of the distance or the shape of the object.

Namely, for example, as shown in FIG. 1A, when taking pictures of an object 22 by two cameras A $10_1$ and B $10_2$, a picture (standard picture) 24a including a picture 220a of the object is obtained from the camera A $10_1$ as shown in FIG. 1B, while a picture (reference picture) 24b including a picture 220b of the object is obtained from the camera B $10_2$. The pictures 220a and 220b of the object include pixels (corresponding points k and k') taken from an identical part on the object 22.

By detecting corresponding points between the standard picture 24a and the reference picture 24b, a parallax between the corresponding points k and k' can be obtained for pixel units as shown in FIG. 1C.

Based on the parallax between the corresponding points k and k' obtained as above and the angles (camera angles) and distances of the two cameras A $10_1$ and B $10_2$, distances between points on the objects 22 and the cameras A $10_1$ and B $10_2$ can be measured by applying the principle of triangulation and, further, a shape of the object 22 can be analyzed from the distances to the points on the object 22.

Area Base Matching

In stereo image processing, for example, the area base matching method is used as the method for establishing correspondence between the point (pixel) k on the picture 220a of the object of the standard picture 24a and the corresponding pixel (corresponding point) k' on the picture 220b of the object of the reference picture 24b.

First, the area base matching method calculates a straight line virtually drawn in the reference picture 24b as shown by a broken line in FIG. 1B, that is, an epipolar line indicating a range where the corresponding point k' of the pixel k exists in the reference picture 24b based on the distances and angles (positional relationship) of the cameras A $10_1$ and B $10_2$ and the position of the pixel on the picture 220a of the object of the standard picture 24a. Next, the correlation is judged between the square pixel blocks of the reference picture 24b including n×n number (for example n=5) of pixels using the pixels on the epipolar line as the center pixels and the square pixel block of the reference picture 24a including n×n number of pixels using the pixel k as the center pixel by using a predetermined evaluation function. The center pixel of the pixel block of the reference picture 24b exhibiting the highest correlation is detected as the corresponding point k' of the pixel k.

Note that the reasons why a pixel block having an n×n configuration is used for detecting the corresponding point are to reduce the effects of noise and to clarifying the correlation between characteristics of a pixel pattern around the pixel k and characteristics of a pixel pattern around the object point k' of the reference picture 24b in the judgement and thereby improve the reliability of the detection of the corresponding point. Especially, for a standard picture 24a and reference picture 24b with little changes, the larger the pixel block used, the more reliable the detection of the corresponding point.

In the area base matching method, as an evaluation function for evaluating the correlation between the pixel blocks, for example, a sum of a square of difference of pixel data between corresponding pixels of two pixel blocks (SSD; Formula 1), a sum of an absolute value of the difference of pixel data between corresponding pixels of two picture blocks, or a normalized cross correlation is used. Below, a case where SSD is used will be explained as an example of the evaluation function of the area base matching method.

$$SSD(x, y, \eta, \xi) = \sum_{i,j \in w} \{I(x+i, y+j) - J(x+i-\eta, y+j-\xi)\}^2 \quad (1)$$

In formula 1, I(x, Y) represents pixel data of a pixel at the coordinates (x, y) in the standard picture 24a, J(x, y) represents pixel data of a pixel at coordinates (x, y) in the reference picture 24b, η represents a parallax in the x direction, ξ represents a parallax in the y direction, and w represents a pixel block.

Namely, the stereo image processing uses the area base matching method to successively find the SSD between pixel blocks of the standard picture 24a and the reference picture 24b while changing the parallax (η, ξ) along the epipolar line in the reference picture 24b corresponding to the pixel k in the reference picture 24a, detects the pixel in the reference picture 24b in which the SSD becomes the minimum value $SSD_{min}$ as a corresponding point k' of the pixel k, then inserts the parallax ($\eta_{min}$, $\xi_{min}$) of the detected corresponding point k' into formula 2 to calculate the parallax ζ.

The distances from the camera A $10_1$ and the camera B $10_2$ to points on the object 22 can be calculated from the positional relationship of the obtained parallax (η, ξ) (hereinafter, referred to as parallax ζ) and the cameras A $10_1$ and B $10_2$.

$$\zeta = \sqrt{\eta^2_{min} + \xi^2_{min}} \quad (2)$$

Evaluation Function (SSD) Value

Note that the SSD value is included in the pixel blocks of the standard picture 24a and the reference picture 24b. The smaller the SSD, value the smaller of the difference of values of pixel data (pixel values) of corresponding pixels.

Accordingly, the minimum SSD value $SSD_{min}$ corresponds to the reliability of detection of the corresponding point k' in the reference picture 24b of the pixel k of the standard picture 24a. The smaller the value of the minimum value $SSD_{min}$, the higher the possibility of correct correspondence of the pixel k and the corresponding point k', that is, the higher the reliability of detection indicated. Conversely, the larger the value of the minimum value $SSD_{min}$, the higher the possibility of incorrect correspondence of the pixel k and the corresponding point k', that is, the lower the reliability indicated.

Disadvantages of Area Base Matching Method

Next, disadvantages of the area base matching method will be explained with reference to FIGS. 2A and 2B and FIGS. 3A to 3E.

Figure 2A:
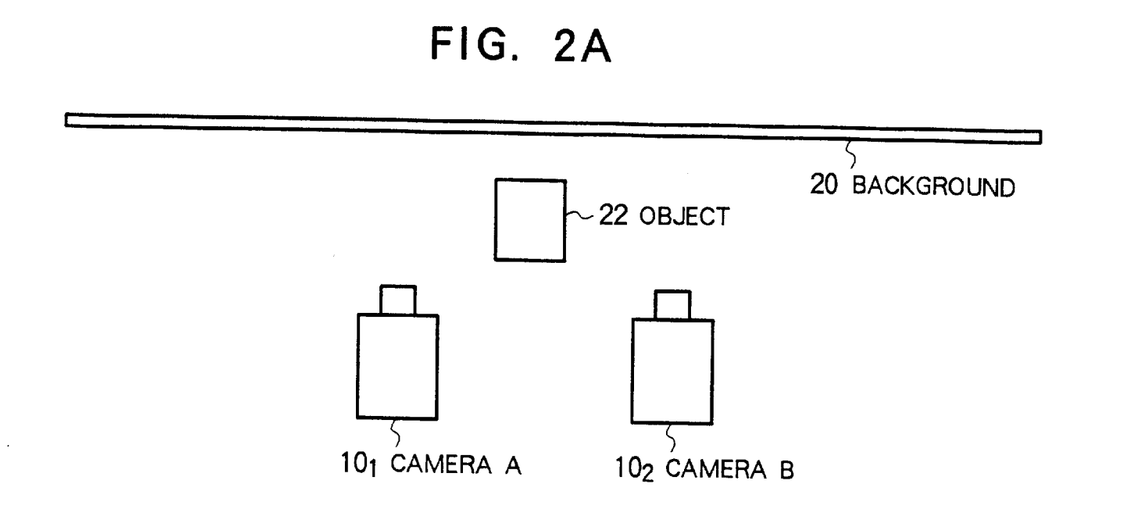
FIGS. 2A and 2B are views of a standard picture and a reference picture obtained by taking pictures of an object placed in front of a background by a camera A and camera B.
Figure 2B:
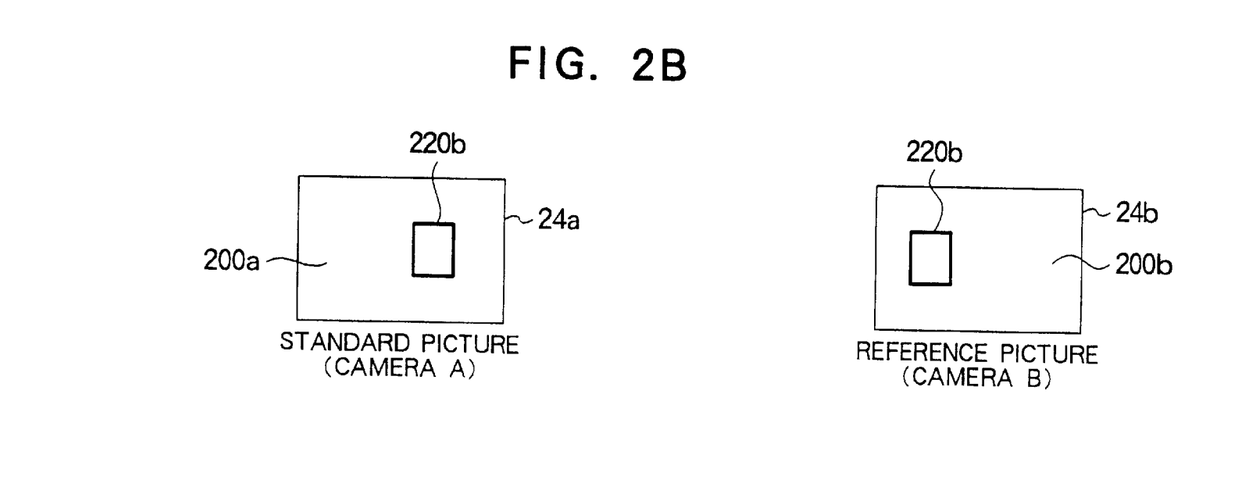

FIGS. 2A and 2B are views of a standard picture 24a and a reference picture 24b obtained by taking pictures of an object 22 placed in front of a background 20 by a camera A $10_1$ and a camera B $10_2$.

FIGS. 3A to 3E are views of an example of incorrect detection of a corresponding point by the area base matching method.

For example, when processing the standard picture 24a and the reference picture 24b shown in FIG. 2B obtained by taking pictures of the object 22 placed in front of the background 20 by the camera A $10_1$ and the camera B $10_2$ as shown in FIG. 2A so as to detect corresponding points using the area base matching method, incorrect detection sometimes is apt to arise when detecting a corresponding point k' in the reference picture for a pixel k of the boundary (edge) portion of the object 22 and the background in the standard picture 24a shown in FIGS. 3A to 3E.

Figure 3A:
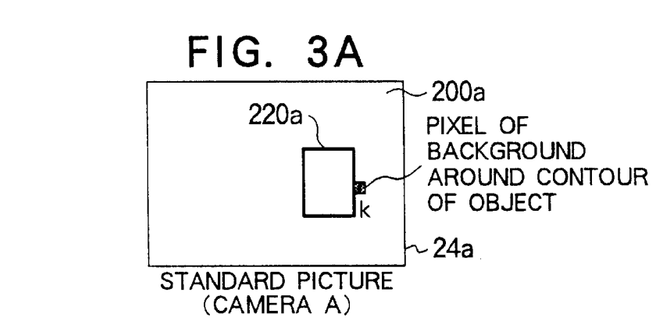
FIGS. 3A to 3E are views of an example of incorrect detection of corresponding points by an area base matching method.
Figure 3B:
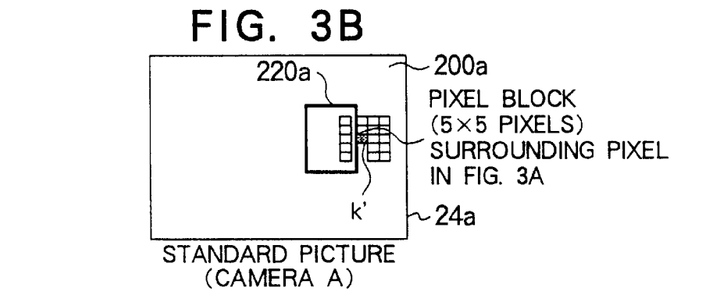
Figure 3C:
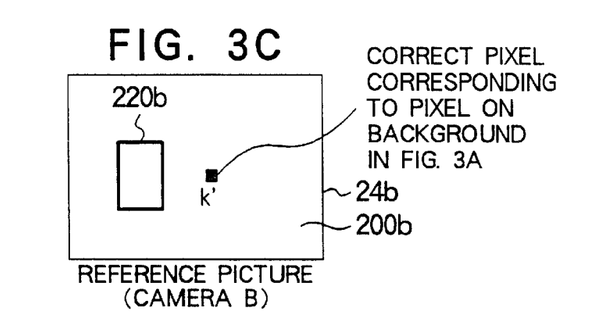

For example, when the parallax (η, ξ) between the pixel k and the corresponding point k' is extremely large, as shown in FIG. 3A, the original corresponding point k' of the picture 200b of the background in the reference picture 24b for the pixel k of the picture 200a of the background next to the picture 220a of the object in the standard picture 24a taken by the camera A $10_1$ sometimes is positioned away from the picture 220a of the object in the reference picture 24b taken by the camera B $10_2$ as shown in FIG. 3C.

Figure 3D:
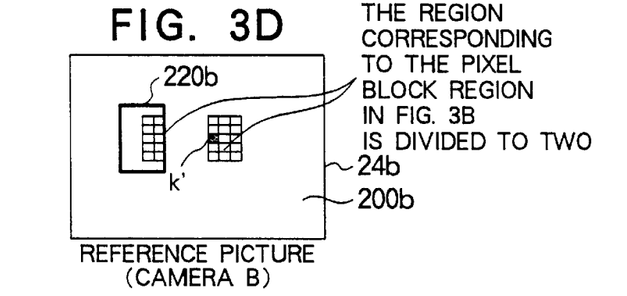

In such a case, as shown in FIG. 3B, the original corresponding points of pixels of two regions of a pixel block of an n×n configuration (below, a case of n=5 will be explained as an example) having the pixel k of the standard picture 24a as a center pixel, having one region contained in the picture 220a of the object, and having the other contained in the picture 200a of the background, are at distant positions in the reference picture as shown in FIG. 3D. The block sometimes ends up divided into two regions with tremendously different parallaxes ($\eta$, $\xi$).

Furthermore, for example, when the patterns of the pictures 200a and 200b of the background and the pattern of the pictures 220a and 220b of the object are very different, the SSD value using pixel blocks containing the pictures 220a and 220b of the object and the pictures 200a and 200b of the background sometimes becomes smaller than the value of picture blocks containing only pictures 200a and 200b of the background.

Figure 3E:
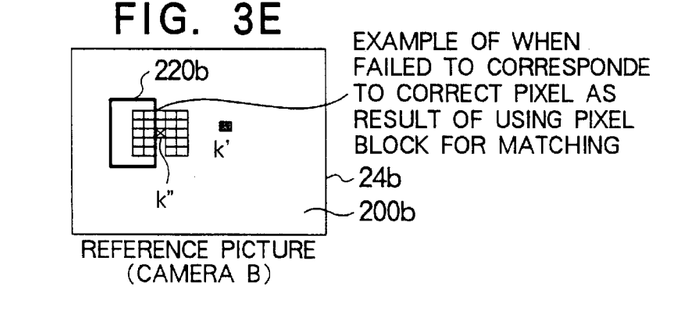

Accordingly, as shown in FIG. 3E, the possibility becomes high that not the original corresponding point k' in the reference picture 24b for the pixel k of the standard picture 24a, but the pixel k" next to the picture 220b of the object will be incorrectly detected as the corresponding point in the reference picture for the pixel k. Note that such cases generally arise not only when the patterns of the pictures 200a and 200b of the background and the pictures 220a and 220b of the object are very different, but also when the patterns of the pictures 200a and 200b of the background and the pictures 220a and 220b of the object are just different.

Although such incorrect detection of the corresponding points can be reduced by making the pixel block smaller, the reliability of the detection of the corresponding points by the area base matching method ends up becoming lower when the pixel block is made smaller.

The embodiment of a distance measuring apparatus explained below is configured to be able to reduce the effects caused by incorrect detection of corresponding points that could arise at the edge portions of pictures etc. while maintaining the reliability of detection of the corresponding points using the area base matching method high.

Configuration of Distance Measuring Apparatus 1

Below, the configuration of a distance measuring apparatus 1 according to an embodiment of the present invention will be explained.

Figure 4:
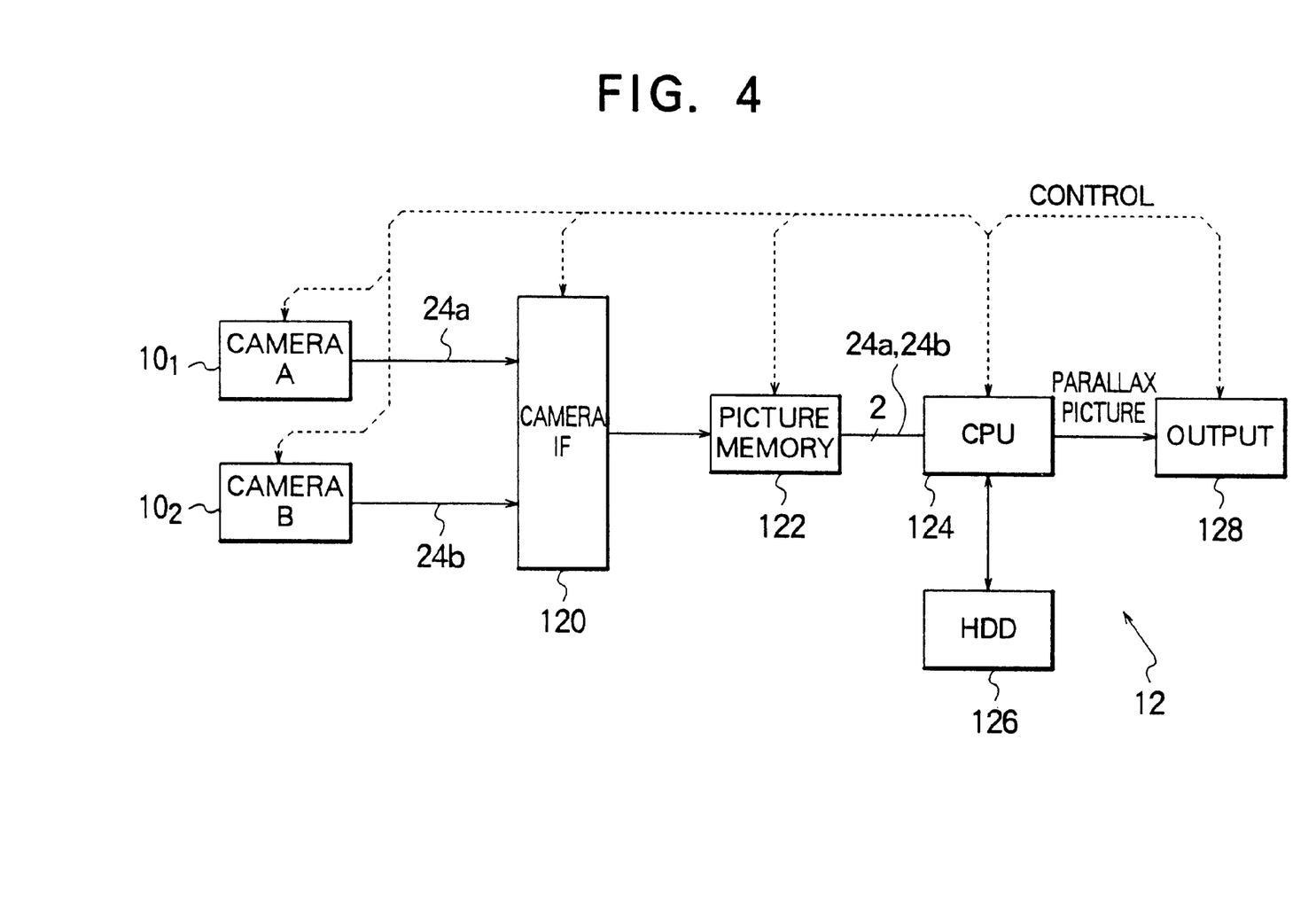
FIG. 4 is a view of the configuration of a distance measuring apparatus according to the present invention.

FIG. 4 is a view of the configuration of the distance measuring apparatus according to the present invention.

As shown in FIG. 4, the distance measuring apparatus 1 is comprised of two cameras A $10_1$ and B $10_2$ and a distance measuring unit 12. The distance measuring unit 12 is comprised of a camera interface (camera IF) circuit 120, a picture memory circuit 122, a processing circuit (CPU) 124, a recording apparatus (HDD) 126, and an output apparatus 128.

The distance measuring apparatus 1 uses the above components to establish correspondence between pixels of a standard picture 24a and pixels of a reference picture 24b obtained by taking pictures of an object by the cameras A $10_1$ and B $10_2$, measures a parallax $\zeta$ between corresponding pixels, and measures a distance between the object 22 and the cameras A $10_1$ and B $10_2$ and a shape of the object 22 based on the measured parallax $\zeta$.

Components of Distance Measuring Apparatus 1

Below, each component of the distance measuring apparatus 1 will be explained.

Camera A $10_1$ and Camera B $10_2$

The camera A $10_1$ and the camera B $10_2$ are, for example, two or more CCD video cameras fixed at different positions or one or more movable CCD video cameras which take pictures of an identical background 20 and object 22 from different positions (FIGS. 2A and 2B), to generate the standard picture 24a and the reference picture 24b and output the same to the distance measuring unit 12.

Camera Interface Circuit 120

The camera interface circuit 120 receives the standard picture 24a and the reference picture 24b input from the camera A $10_1$ and the camera B $10_2$ and outputs the same to the picture memory circuit 122.

Picture Memory Circuit 122

The picture memory circuit 122 stores the standard picture 24a and the reference picture 24b input via the camera interface circuit 120 in units of frames and provides the same to the processing circuit 124.

Processing Circuit 124

The processing circuit 124 comprises, for example, a digital signal processor (DSP) for image processing, a central processing unit (CPU) for control, a read only memory (ROM), a random access memory (RAM), and other peripheral circuits (not illustrated). It controls the components of the distance measuring apparatus 1 and performs stereo image processing on the standard picture 24a and the reference picture 24b, measures parallaxes $\zeta$ of points on the object 22 with respect to the camera A $10_1$ and the camera B $10_2$, measures the distance between the camera A $10_1$ and B $10_2$ and points on the object 22, analyzes the shape of the object 22, and records the obtained results in the recording apparatus 126 or outputs the same to the outside via an output apparatus 128.

Stereo Image Processing of Processing Circuit 124

Below, an explanation will be given of details of the stereo image processing by the processing circuit 124 with reference to FIGS. 5A and 5B.

Figure 5A:
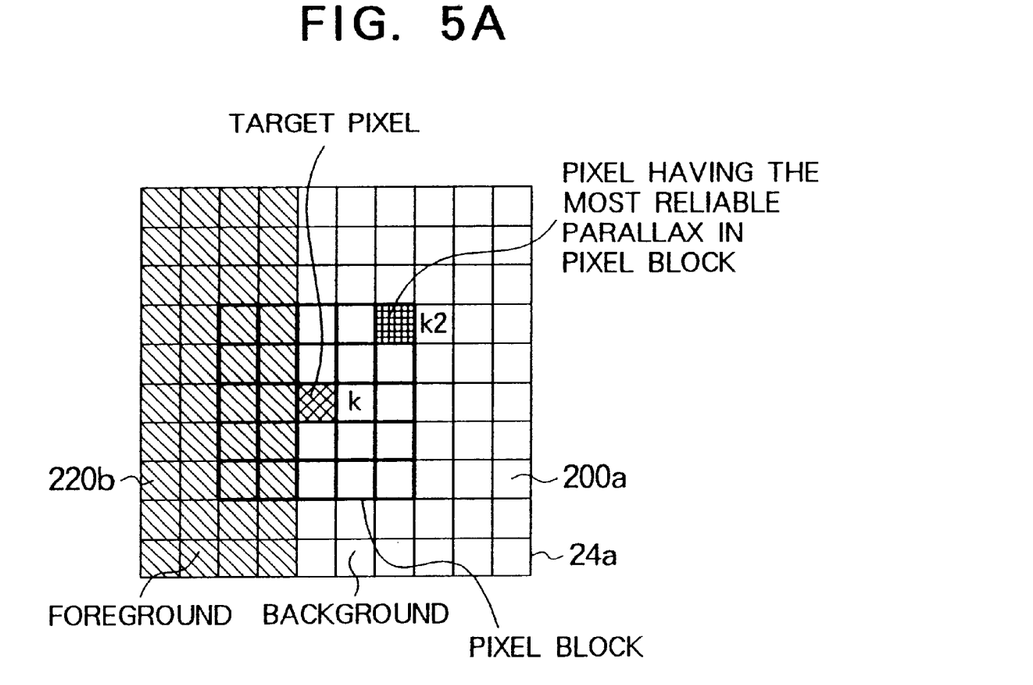
FIGS. 5A and 5B are views of correction processing of a parallax $\zeta$ in a processing circuit of the distance measuring apparatus according to the present invention in FIG. 4.
Figure 5B:
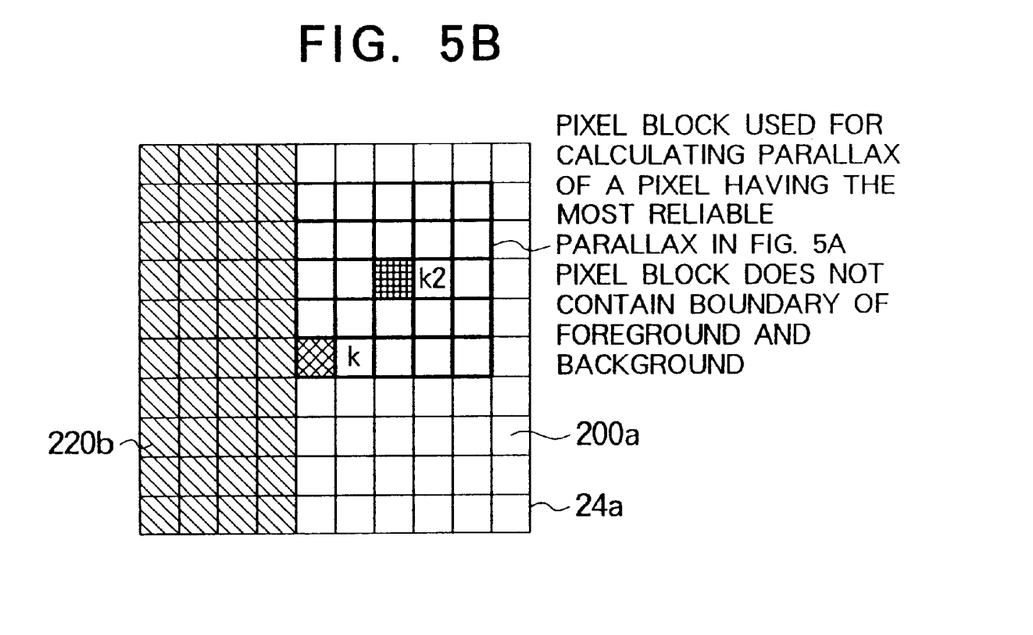

FIGS. 5A and 5B are views of processing for correction of a parallax $\zeta$ by the processing circuit 124 of the distance measuring apparatus (FIG. 4) according to the present invention.

Calculation of Parallax

First, the processing circuit 124 establishes correspondence between pixels of the standard picture 24a and pixels of the reference picture 24b by, for example as explained above, the area base matching method using the SSD indicated in formula 1 as an evaluation function, calculates a parallax $\zeta$ (first parallax) by using formula 2, generates a parallax picture by establishing correspondence to the corresponding pixels of the standard picture 24a or the reference picture 24b, and stores the result in the RAM in the processing circuit 124.

Evaluation of Reliability of Detection of Corresponding Points

Next, the processing circuit 124 judges the correspondence of a pixel k of the standard picture 24a and a corresponding point k' to be reliable when the minimum value $SSD_{min}$ of the SSD at the time of detection of the pixel k of the standard picture 24a and the corresponding point k' of the reference picture 24b is below a predetermined threshold, while judges the correspondence between the pixel k of the standard picture 24a and the corresponding point k' to be unreliable when the minimum value $SSD_{min}$ is not below the predetermined threshold. Note that the threshold used for detecting corresponding points is set at the most suitable value by experiments etc.

When the detection of the corresponding point k' in the reference picture 24b for the pixel k of the standard picture is evaluated as being reliable, the processing circuit 124 regards the calculated first parallax $\zeta 1$ as a correct parallax $\zeta$ as it is, while when the detection of the corresponding point k' in the reference picture 24b for the pixel k of the standard picture is evaluated as being unreliable, the processing circuit 124 carries out the following correction of the parallax $\zeta$.

Correction of Parallax

The processing circuit 124, as shown in FIG. 5A, detects the pixel exhibiting the smallest value among the SSD values ($SSD_{min}$) found by the area base matching processing for the pixels contained in a pixel block of an m×m configuration (however, case of m=n given as example) having a standard pixel k whose correspondence is evaluated as being uncertain as a center pixel, containing a pixel block of an n×n configuration used in detecting the corresponding point, and larger than that pixel block.

Namely, the processing circuit 124 decides that the pixel of the standard picture 24a exhibiting the smallest SSD value, among the m×m number of $SSD_{min}$ values between pixel blocks in a standard picture 24a having an n×n configuration with, as center pixels, the m×m number of pixels contained in a pixel block of an m×m configuration with a standard pixel k of the standard picture 24a as a center pixel and pixel blocks in a reference picture 24b of an n×n configuration with, as center pixels, the corresponding points of the m×m number of standard pixels contained in the pixel block of an m×m configuration with the standard pixel k of the standard picture 24a as a center pixel, is most reliable in correspondence with the corresponding point.

Furthermore, the processing circuit 124 corrects the parallax ζ by replacing the first parallax ζ1 of the pixel k and its corresponding point k" in the parallax picture with a parallax of the pixel judged to have the most reliable correspondence in the standard picture 24a and its corresponding point.

The processing circuit 124 generates a parallax picture corresponding to the pixels of the standard picture 24a or the reference picture 24b from the parallaxes ζ obtained as explained above, calculates the distance between the camera A $10_1$ and B $10_2$ and points on the object 22 and analyzes the shape of the object 22 based on the parallax picture, and stores the results in the recording apparatus 126 or outputs the same to the output apparatus 128.

Meaning of Parallax Correction

Replacing the first parallax ζ1 between the pixel k of the standard picture 24a and the corresponding point k" of the reference picture detected at first as its corresponding point with the parallax between a pixel of the standard picture 24a which gives the smallest SSD value near the pixel k of the standard picture 24a and its corresponding point k' in this way means, for example, discarding the corresponding point k" which is incorrectly detected at the boundary (edge) portion of the object 22 and the background 20 as shown in FIG. 3E, avoiding the boundary (edge) portion wherein incorrect detection of the corresponding point is apt to arise as shown in FIG. 5B, assuming that the parallax with a corresponding point obtained using the area base matching processing by a pixel block wherein pixels of the picture 200a of the background and the pixels of the object picture 220a do not co-exist and the parallax of a corresponding point that should originally correspond at the pixel k are equal, and replacing the incorrectly detected parallax with the more reliable parallax.

It can be considered that the value of a second parallax ζ2 between a pixel k2 of the standard picture 24a and the corresponding point k2' (not illustrated) is more reliable because it has smaller possibility of incorrect detection of corresponding points in the area base matching processing than the value of the first parallax ζ1 between the pixel k of the standard picture 24a and the corresponding point k".

Operation of Distance Measuring Apparatus 1

Below, the operation of the distance measuring apparatus 1 will be explained with reference to FIG. 6.

Figure 6:
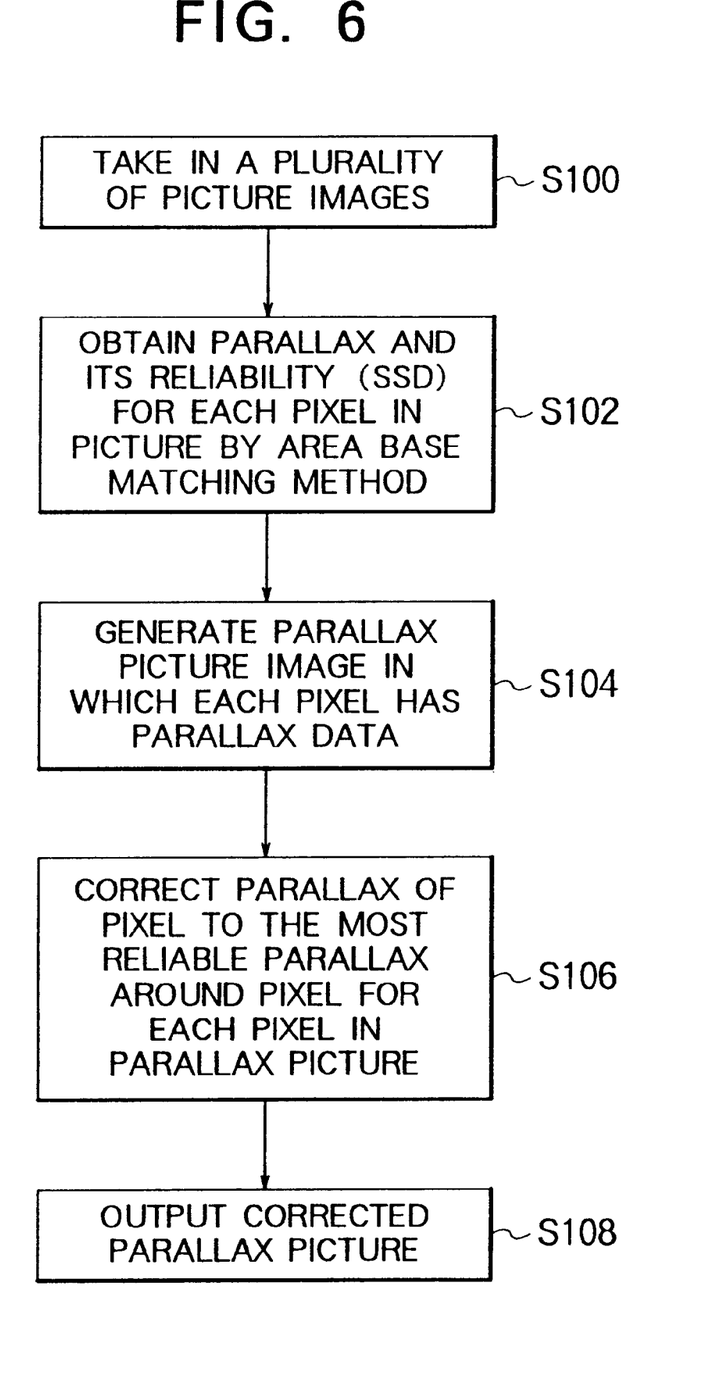
FIG. 6 is a flow chart of an operation of the distance measuring apparatus according to the present invention.

FIG. 6 is a flow chart of the operation of the distance measuring apparatus according to the present invention.

As shown in FIG. 6, at step 100 (S100), the distance measuring unit 12 of the distance measuring apparatus 1 fetches a plurality of (two) pictures (the standard picture 24a and the reference picture 24b) from the camera A $10_1$ and the camera B $10_2$.

At step S102, the processing circuit 124 of the distance measuring unit 12 calculates an SSD between pixel blocks of an n×n configuration having pixels of the standard picture 24a as center pixels and pixel blocks of an n×n configuration having pixels of the reference picture 24b on the epipolar line as center pixels and detects corresponding points by establishing correspondence between the pixels of the standard picture 24a and the center pixel of the pixel block of the reference picture 24b which gives the minimum value $SSD_{min}$. That is, the processing circuit 124 detects corresponding points by the area base matching method between the pixels of the standard picture 24a and the pixels of the reference picture 24b.

At step S104, the processing circuit calculates a first parallax ζ1 between the pixels of the standard picture 24a and the corresponding points of the reference picture 24b detected in the processing of step S102 and generates a parallax picture by establishing correspondence between the pixels of the standard picture 24a and the pixels of the reference picture 24b.

At step S106, the processing circuit 124 compares the minimum value $SSD_{min}$ among the SSD corresponding to the calculated parallax ζ1 with the above threshold. When the minimum value $SSD_{min}$ is larger than the threshold, it corrects the parallax by replacing the parallax ζ1 in the parallax picture with the parallax ζ2 of a pixel of the standard picture 24a judged to most reliably correspond to the corresponding point and its corresponding point.

At step S108, the processing circuit 124 outputs the data showing the corrected parallax picture, the distance between the object 22 and the cameras A $10_1$ and B $10_2$ obtained from the corrected parallax, and the shape of the object 22 obtained as a result of analysis to the recording apparatus 126 and/or the output apparatus 128.

As explained above, according to the distance measuring apparatus 1 of the present invention, the precision of the parallax obtained by stereo matching image processing using the area base matching method can be greatly improved, a more correct picture of distance can be obtained, and a clearer picture of the object can be obtained by the shape analysis.

Note that in addition to the above embodiment, it is possible to modify the operation of the distance measuring apparatus 1 to, for example, perform correction processing unconditionally for all the parallaxes ζ instead of just the parallax ζ1 where the minimum value $SSD_{min}$ is larger than the threshold.

Also, when carrying out the calculation processing and the correction processing for the parallax ζ1 sequentially, a long processing time is required. Accordingly, it is possible to modify the operation of the distance measuring apparatus 1 to, for example, be able to perform the calculation processing and the correction processing for the parallax ζ1 in parallel when the calculation of the minimum value $SSD_{min}$ of the SSD has been completed.

Also, in the correction processing of the above embodiment, an incorrectly detected pixel having an evaluation value larger than the predetermined threshold was detected and the $SSD_{min}$ for all of the pixels contained in the pixel block of an m×m configuration having the incorrectly detected pixel as a center pixel were compared to select the smallest $SSD_{min}$. However, since a long time is required for the inspection, it is possible to modify the correction processing of the distance measuring apparatus 1 to, for example, compare only the $SSD_{min}$ of pixels surrounding the pixel block of the m×m configuration having the incorrectly detected pixel as a center pixel to select the smallest $SSD_{min}$ or to compare only the $SSD_{min}$ of every other pixel surrounding the pixel block of the m×m configuration having the incorrectly detected pixel as a center pixel to select the smallest $SSD_{min}$.

Also, it is possible to perform the correction processing after calculating the picture of distance. Namely, in the above embodiment, the parallax was replaced with the parallax obtained from another pixel when the evaluation value was larger than the predetermined threshold, however, it is possible to modify the correction processing of the distance measuring apparatus 1 to calculate the distance at pixels using the parallax obtained by the area base matching method as it is, search for the pixel which is detected to have the most reliable corresponding point among the neighboring pixels for the pixel whose corresponding point was incorrectly detected In the same way as in the above correction processing, and replace the distance value of the incorrectly detected pixel with the distance value of the found pixel. In this case, the correction processing for the distance can be carried out by performing the correction processing suitably reading the processing for "parallax" in the correction processing in the above embodiment as "distance".

Also, the components of the distance measuring apparatus 1 of the present invention were examples. So long as the equivalent functions and performances can be realized, it does not matter if they are realized using software-like means or hardware-like means. Note that software which performs the above processing is provided to the processing apparatus by a memory medium such as a magneto-optic disk, optical disk, and magnetic disk or by a transmission medium such as a network.

Also, the configuration of the pixel block used for the detection processing of corresponding points and the correction processing of the parallax was given as an example. The detection processing of the corresponding points and the correction processing of the parallax can be carried out by using an pixel block of another configuration, for example, a rectangular pixel block.

Also, the distance measuring apparatus 1 was configured to obtain the standard picture 24a and the reference picture 24b using two cameras, however, it is possible to modify the configuration of the distance measuring apparatus 1 to obtain the standard picture 24a and the reference picture 24b by using any two cameras among three or more cameras or by moving one camera.

It is also possible to provide the parallax information or the distance information generated by the distance measuring apparatus 1 in the embodiment to other processing apparatuses by a memory medium such as a magneto-optic disk, optical disk, and magnetic disk or by a transmission medium such as a network.

As explained above, according to the present invention, it is possible to correct the parallax information between pixels obtained from a plurality of pictures of an object to reliable value.

Also, according to the present invention, by correcting the parallax information among pixels obtained by a plurality of pictures of the object to a reliable value, it is possible to measure the correct distance and the shape of the object.

Note that the present invention is not limited to the above embodiments and includes modifications within the scope of the claims.

What is claimed is:

1. A parallax calculating apparatus comprising:
    a standard picture generating means for generating a standard picture taken of an object at a first view position;
    a reference picture generating means for generating a reference picture taken of said object at a second view position;
    a detecting means for detecting a first corresponding pixel of said reference picture corresponding to a first pixel of said standard picture based on an evaluation function that indicates an accuracy of correspondence;
    a parallax calculating means for calculating parallax information between said first pixel of said standard picture and said first corresponding pixel in said reference picture; and
    a correcting means for correcting the parallax information of the first pixel of said standard picture and the first corresponding pixel of said reference picture when said evaluation function indicates an unreliable accuracy of correspondence, using parallax information of a second pixel of said standard picture and a second corresponding pixel of said reference picture wherein the second pixel is in a predetermined local region of the standard picture containing the first pixel and wherein said second pixel exhibits the highest accuracy of correspondence of pixels within said region.

2. A parallax calculating apparatus as set forth in claim 1, wherein said correcting means corrects the parallax information of the first pixel of said standard picture and the first corresponding pixel of said reference picture based on parallax information of a second pixel in said standard picture positioned near the first pixel of said standard picture and the second corresponding pixel of said reference picture.

3. A parallax calculating apparatus as set forth in claim 1, wherein said correcting means corrects the parallax information at a first pixel of said standard picture by replacing it with parallax information at a second pixel in said standard picture.

4. A parallax calculating apparatus as set forth in claim 1, wherein said detecting means detects a corresponding pixel using a predetermined evaluation function for a pixel value of a pixel of said standard picture and a pixel value of a pixel of said reference picture.

5. A parallax calculating apparatus as set forth in claim 1, wherein said correcting means comprises:
    a selecting means for selecting a second pixel from said predetermined region based on accuracy of a relationship of correspondence between the first pixel of the standard picture and the second corresponding pixel of the reference picture, the first pixel of said standard picture and the first corresponding pixel of said reference picture corresponding to the picture in the predetermined region; and
    a parallax correcting means for correcting the parallax information of the first pixel of said standard picture and the first corresponding pixel of said reference picture based on the parallax information at a second pixel in said standard picture and a second corresponding pixel of said reference picture selected by the selecting means.

6. A parallax calculating apparatus as set forth in claim 5, wherein the selecting means selects a second pixel exhibiting the highest value, among the pixels found, of accuracy of a relationship of correspondence between the first pixel of the standard picture and the first corresponding pixel of the reference picture, the first pixel of the standard picture and the first corresponding pixel of the reference picture corresponding to the picture in the predetermined region.

7. A parallax calculating apparatus as set forth in claim 5, wherein the selecting means selects the second pixel by searching through pixels positioned at the outermost circumference of the predetermined region.

8. A parallax calculating apparatus as set forth in claim 5, wherein the selecting means selects the second pixel by searching through all pixels in the predetermined region.

9. A parallax calculating apparatus as set forth in claim 5, wherein
the detecting means detects a corresponding pixel by using a predetermined evaluation function for a pixel value of a pixel of the standard picture and a pixel value of a pixel of the reference picture; and
the selecting means selects a pixel from the predetermined region by evaluating an accuracy of a relationship of correspondence between the pixel of the standard picture and the corresponding pixel of the reference picture based on the value of the predetermined evaluation function.

10. A parallax calculating apparatus as set forth in claim 5, wherein
the detecting means detects a corresponding pixel by using a predetermined evaluation function for pixel values of pixels of the standard picture and pixel values of pixels of the reference picture in a range having a possibility of corresponding to the pixels of the standard picture and
the selecting means selects a pixel from the predetermined region by evaluating the accuracy of a relationship of correspondence between the pixel of the standard picture and the corresponding pixel of the reference picture based on the value of the predetermined evaluation function.

11. A parallax calculating apparatus as set forth in claim 5, wherein
the detecting means detects a corresponding pixel by using a predetermined evaluation function for pixel values of pixels contained in pixel blocks having pixels of the standard picture as center pixels and pixel values of pixels contained in pixel blocks having as center pixels of the reference picture in a range having a possibility of corresponding to the pixels of the standard picture;
the selecting means selects a pixel from among those pixels, exhibiting the highest value of accuracy of a relationship of correspondence between the pixel of the standard picture corresponding to the pixels and the corresponding pixel of the reference picture based on the values of the evaluation function at the pixels contained in the pixel block having the first pixel of said standard picture as a center pixel; and
the parallax correcting means corrects the parallax information of the first pixel in said standard picture and the first corresponding pixel in reference picture by replacing it with the parallax information at a second pixel selected by the selecting means and the second corresponding pixel in said reference picture.

12. A parallax calculating method comprising:
a standard picture generating step for generating a standard picture taken of an object at a first view position;
a reference picture generating step for generating a reference picture taken of said object at a second view position;
a detecting step for detecting a corresponding pixel of said reference picture corresponding to a pixel of said standard picture based on a evaluation function that indicates an accuracy of correspondence;
a parallax calculating step for calculating parallax information between a pixel of said standard picture and a detected corresponding pixel in said reference picture; and
a correcting step for correcting parallax information of a first pixel of said standard picture and a first corresponding pixel of said reference picture when said evaluation function indicates an unreliable accuracy of correspondence using the parallax information of a second pixel of said standard picture and a second corresponding pixel of said reference picture wherein the parallax information at the first pixel of said standard picture and the corresponding first pixel of said reference picture is corrected based on parallax information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

13. A parallax calculating method as set forth in claim 12, wherein said correcting step corrects the parallax information at a first pixel of said standard picture by replacing it with parallax information at second pixel of said standard picture.

14. A parallax calculating method as set forth in claim 12, wherein said detecting step detects a corresponding pixel using a predetermined evaluation function for a pixel value of a pixel of said standard picture and a pixel value of a pixel of said reference picture.

15. A parallax calculating method as set forth in claim 12, wherein said correcting step corrects the parallax information at a first pixel of said standard picture based on parallax information at second pixel in said standard picture in a predetermined region containing the first pixel.

16. A parallax calculating method as set forth in claim 15, wherein said correcting step comprises:
a selecting step for selecting a pixel in said standard picture from said predetermined region based on accuracy of a correspondence between a pixel of the standard picture and a corresponding pixel of the reference picture, the pixel of the standard picture and the corresponding pixel of the reference picture corresponding to the picture in the predetermined region; and
a parallax correcting step for correcting the parallax information of the first pixel in said standard picture and the first corresponding pixel in a reference picture based on the parallax information at a second pixel in said standard picture selected by the selecting step.

17. A parallax calculating method as set forth in claim 16, wherein the selecting step selects the pixel exhibiting the highest value, among the pixels found, of accuracy of a relationship of correspondence between the pixel of the standard picture and the corresponding pixel of the reference picture, the pixel of the standard picture and the corresponding pixel of the reference picture corresponding to the picture in the predetermined region.

18. A parallax calculating method as set forth in claim 16, wherein the selecting step selects a second pixel by searching through pixels positioned at the outermost circumference of the predetermined region.

19. A parallax calculating method as set forth in claim 16, wherein the selecting step selects a second pixel by searching through all pixels in the predetermined region.

20. A parallax calculating method as set forth in claim 16, wherein
the detecting step detects a corresponding pixel by using a predetermined evaluation function for a pixel value of a pixel of the standard picture and a pixel value of a pixel of the reference picture and
the selecting step selects a pixel from the predetermined region by evaluating the accuracy of a relationship of correspondence between the pixel of the standard picture and the corresponding pixel of the reference picture based on the value of the predetermined evaluation function.

21. A parallax calculating method as set forth in claim 16, wherein
the detecting step detects a corresponding pixel by using a predetermined evaluation function for pixel values of pixels of the standard picture and pixel values of pixels of the reference picture in a range having a possibility of corresponding to the pixels of the standard picture and
the selecting step selects a pixel from the predetermined region by evaluating the accuracy of correspondence between the pixel of the standard picture and the corresponding pixel of the reference picture based on the value of the predetermined evaluation function.

22. A parallax calculating method as set forth in claim 16, wherein
the detecting step detects a corresponding pixel by using a predetermined evaluation function for pixel values of pixels contained in pixel blocks having pixels of the standard picture as center pixels and pixel values of pixels contained in pixel blocks having as center pixels of the reference picture in a range having a possibility of corresponding to the pixels of the standard picture;
the selecting step selects from that range the pixel, among those pixels, exhibiting the highest value of accuracy of a relationship of correspondence between the pixel of the standard picture corresponding to the pixels and the corresponding pixel of the reference picture based on the values of the evaluation function at the pixels contained in the pixel block having the pixel in said standard picture as a center pixel; and
the parallax correcting step corrects the parallax information of the first pixel in said standard picture and a first corresponding pixel in a reference picture by replacing it with the parallax information at a second pixel in said standard picture and a corresponding second pixel in the reference picture selected by the selecting step.

23. An information provision medium providing a processing apparatus with control information comprising:
a standard picture generating step for generating a standard picture taken of an object at a first view position;
a reference picture generating step for generating a reference picture taken of said object at a second view position;
a detecting step for detecting a corresponding pixel of said reference picture corresponding to a pixel of said standard picture based on a evaluation function that indicates an accuracy of correspondence;
a parallax calculating step for calculating parallax information between a pixel of said standard picture and a detected corresponding pixel; and
a correcting step for correcting parallax information of a first pixel in said standard picture and a first corresponding pixel in a reference picture when said evaluation function indicates an unreliable accuracy of correspondence using the parallax information of a second pixel in said standard picture and the second corresponding pixel in the reference picture wherein the parallax information at the first pixel of said standard picture and the corresponding first pixel of said reference picture is corrected based on parallax information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

24. An information provision medium providing a processing apparatus with parallax information generated by:
a standard picture generating step for generating a standard picture taken of an object at a first view position;
a reference picture generating step for generating a reference picture taken of said object at a second view position;
a detecting step for detecting a corresponding pixel of said reference picture corresponding to a pixel of said standard picture based on a evaluation function that indicates an accuracy of correspondence;
a parallax calculating step for calculating parallax information between a pixel of said standard picture and a detected corresponding pixel in said reference picture; and
a correcting step for correcting parallax information of a first pixel in said standard picture and a first corresponding pixel in a reference picture when said evaluation function indicates an unreliable accuracy of correspondence using the parallax information of a second pixel in said standard picture and a second corresponding pixel in the reference picture wherein the parallax information at the first pixel of said standard picture and the corresponding first pixel of said reference picture is corrected based on parallax information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

25. A distance calculating apparatus comprising:
a standard picture generating means for generating a standard picture taken of an object at a first view position;
a reference picture generating means for generating a reference picture taken of said object at a second view position;
a detecting means for detecting a corresponding pixel of said reference picture corresponding to a pixel of said standard picture based on a evaluation function that indicates an accuracy of correspondence;
a distance calculating means for calculating distance information between a pixel of said standard picture and a detected corresponding pixel; and
a correcting means for correcting distance information of a first pixel in said standard picture and a first corresponding pixel in a reference picture when said evaluation function indicates an unreliable accuracy of correspondence using the distance information of a second pixel in said standard picture and a second corresponding pixel in the reference picture wherein the distance information at the first pixel of said standard picture and the corresponding first pixel of said reference picture is corrected based on distance information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

26. A distance calculating apparatus as set forth in claim 25, wherein said correcting means corrects the distance information at a first pixel in said standard picture by replacing it with distance information at a second pixel in said standard picture.

27. A distance calculating apparatus as set forth in claim 25, wherein said detecting means detects a corresponding pixel using a predetermined evaluation function for a pixel value of a pixel of said standard picture and a pixel value of a pixel of said reference picture.

28. A distance calculating apparatus as set forth in claim 25, wherein said correcting means corrects the distance information at a first pixel in said standard picture based on a distance information at a second pixel in a predetermined region of said standard picture containing the first pixel.

29. A distance calculating apparatus as set forth in claim 28, wherein said correcting means comprises:
a selecting means for selecting a pixel from said predetermined region based on accuracy of a relationship of correspondence between a pixel of the standard picture and a corresponding pixel of the reference picture, the pixel of the standard picture and the corresponding pixel of the reference picture corresponding to the picture in the predetermined region; and
a distance correcting means for correcting the distance information of the first pixel in said standard picture and a first corresponding pixel in a reference picture based on the distance information at a second pixel in said standard picture and second corresponding pixel in the reference picture selected by the selecting means.

30. A distance calculating apparatus as set forth in claim 29, wherein the selecting means selects the pixel exhibiting the highest value, among the pixels found, of accuracy of a relationship of correspondence between the pixel of the standard picture and the corresponding pixel of the reference picture, the pixel of the standard picture and the corresponding pixel of the reference picture corresponding to the picture in the predetermined region.

31. A distance calculating apparatus as set forth in claim 29, wherein the selecting means selects a second pixel in said standard picture by searching through pixels positioned at the outermost circumference of the predetermined region.

32. A distance calculating apparatus as set forth in claim 29, wherein the selecting means selects a second pixel in said standard picture by searching through all pixels in the predetermined region.

33. A distance calculating apparatus as set forth in claim 29, wherein
the detecting means detects a corresponding pixel by using a predetermined evaluation function for a pixel value of a pixel of the standard picture and a pixel value of a pixel of the reference picture and the selecting means selects a pixel from the predetermined region by evaluating the accuracy of a relationship of correspondence between the pixel of the standard picture and the corresponding pixel of the reference picture based on the value of the predetermined evaluation function.

34. A distance calculating apparatus as set forth in claim 29, wherein
the detecting means detects a corresponding pixel by using a predetermined evaluation function for pixel values of pixels of the standard picture and pixel values of pixels of the reference picture in a range having a possibility of corresponding to the pixels of the standard picture and
the selecting means selects a pixel from the predetermined region by evaluating the accuracy of correspondence between the pixel of the standard picture and the corresponding pixel of the reference picture based on the value of the predetermined evaluation function.

35. A distance calculating apparatus as set forth in claim 29, wherein
the detecting means detects a corresponding pixel by using a predetermined evaluation function for pixel values of pixels contained in pixel blocks having pixels of the standard picture as center pixels and pixel values of pixels contained in pixel blocks having as center pixels of the reference picture in a range having a possibility of corresponding to the pixels of the standard picture;
the selecting means selects from that range the pixel, among those pixels, exhibiting the highest value of accuracy of a relationship of correspondence between the pixel of the standard picture corresponding to the pixels and the corresponding pixel of the reference picture based on the values of the evaluation function at the pixels contained in the pixel block having the pixel to be corrected as a center pixel; and
the distance correcting means corrects the distance information of the first pixel in said standard picture and a first corresponding pixel in a reference picture by replacing it by the distance information at a second pixel in said standard picture selected by the selecting means and the second corresponding pixel in the reference picture.

36. A distance calculating method comprising:
a standard picture generating step for generating a standard picture taken of an object at a first view position;
a reference picture generating step for generating a reference picture taken of said object at a second view position;
a detecting step for detecting a corresponding pixel of said reference picture corresponding to a pixel of said standard picture based on a evaluation function that indicates an accuracy of correspondence;
a distance calculating step for calculating distance information between a first pixel of said standard picture and a first corresponding pixel in said reference picture; and
a correcting step for correcting distance information of the pixel of said standard picture and the corresponding pixel of said reference picture when said evaluation function indicates an unreliable accuracy of correspondence using the distance information associated with a second pixel of said standard picture and a corresponding second pixel of said reference picture wherein the distance information at the first pixel of said standard picture and the corresponding first pixel of said reference picture is corrected based on distance information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

37. A distance calculating method as set forth in claim 36, wherein said correcting step corrects the distance information at a first pixel in said standard picture by replacing it with distance information at a second pixel in said standard picture.

38. A distance calculating method as set forth in claim 36, wherein said detecting step detects a corresponding pixel using a predetermined evaluation function for a pixel value of a pixel of said standard picture and a pixel value of a pixel of said reference picture.

39. A distance calculating method as set forth in claim 36, wherein said correcting step corrects the distance information at a first pixel in said standard picture based on distance information at a second pixel in said standard picture in a predetermined region containing the first pixel.

40. A distance calculating method as set forth in claim 39, wherein said correcting step comprises:
 a selecting step for selecting a pixel from said predetermined region based on accuracy of a relationship of correspondence between a pixel of the standard picture, corresponding to a pixel in the predetermined region, and a corresponding pixel of the reference picture and
 a distance correcting step for correcting the distance information of the first pixel in said standard picture and the first corresponding pixel in said reference picture based on the distance information at a second pixel in said standard picture selected by the selecting step and the second corresponding pixel in said reference picture.

41. A distance calculating method as set forth in claim 40, wherein the selecting step selects the pixel exhibiting the highest value, among the pixels found, of accuracy of a relationship of correspondence between the pixel of the standard picture and the corresponding pixel of the reference picture, the pixel of the standard picture and the corresponding pixel of the reference picture corresponding to the picture in the predetermined region.

42. A distance calculating method as set forth in claim 40, wherein the selecting step selects a second pixel in said standard picture by searching through pixels positioned at the outermost circumference of the predetermined region.

43. A distance calculating method as set forth in claim 40, wherein the selecting step selects a second pixel in said standard picture by searching through all pixels in the predetermined region.

44. A distance calculating method as set forth in claim 40, wherein
 the detecting step detects a corresponding pixel by using a predetermined evaluation function for a pixel value of a pixel of the standard picture and a pixel value of a pixel of the reference picture and
 the selecting step selects a pixel from the predetermined region by evaluating the accuracy of a relationship of correspondence between the pixel of the standard picture and the corresponding pixel of the reference picture based on the value of the predetermined evaluation function.

45. A distance calculating method as set forth in claim 40, wherein
 the detecting step detects a corresponding pixel by using a predetermined evaluation function for pixel values of pixels of the standard picture and pixel values of pixels of the reference picture in a range having a possibility of corresponding to the pixels of the standard picture and
 the selecting step selects a pixel from the predetermined region by evaluating the accuracy of a relationship of correspondence between the pixel of the standard picture and the corresponding pixel of the reference picture based on the value of the predetermined evaluation function.

46. A distance calculating method as set forth in claim 40, wherein
 the detecting step detects a corresponding pixel by using a predetermined evaluation function for pixel values of pixels contained in pixel blocks having pixels of the standard picture as center pixels and pixel values of pixels contained in pixel blocks having as center pixels of the reference picture in a range having a possibility of corresponding to the pixels of the standard picture;
 the selecting step selects from that range the pixel, among those pixels, exhibiting the highest value of accuracy of a relationship of correspondence between the pixel of the standard picture corresponding to the pixels and the corresponding pixel of the reference picture based on the values of the evaluation function at the pixels contained in the pixel block having the first pixel as a center pixel; and
 the distance correcting step corrects the distance information of the first pixel in said standard picture and the first corresponding pixel in said reference picture by replacing it with the distance information at a second pixel in said standard picture selected by the selecting step and the second corresponding pixel in said reference picture.

47. An information provision medium providing a processing apparatus with control information comprising:
 a standard picture generating step for generating a standard picture taken of an object at a first view position;
 a reference picture generating step for generating a reference picture taken of said object at a second view position;
 a detecting step for detecting a corresponding pixel of said reference picture corresponding to a pixel of said standard picture based on a evaluation function that indicates an accuracy of correspondence;
 a distance calculating step for calculating distance information between a pixel of said standard picture and a detected corresponding pixel; and
 a correcting step for correcting distance information of a first pixel in said standard picture and a first corresponding pixel in a reference picture when said evaluation function indicates an unreliable accuracy of correspondence based on the distance information of a second pixel in said standard picture and the second corresponding pixel in the reference picture wherein the distance information at the first pixel of said standard picture and the corresponding first pixel of said reference picture is corrected based on distance information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

48. An information provision medium providing a processing apparatus with distance information generated by:

a standard picture generating step for generating a standard picture taken of an object at a first view position;

a reference picture generating step for generating a reference picture taken of said object at a second view position;

a detecting step for detecting a corresponding pixel of said reference picture corresponding to a pixel of said standard picture based on a evaluation function that indicates an accuracy of correspondence;

a distance calculating step for calculating distance information between a pixel of said standard picture and a detected corresponding pixel; and a correcting step for correcting distance information of a first pixel in said standard picture and a first corresponding pixel in a reference picture when said evaluation function indicates an unreliable accuracy of correspondence based on the distance information of a second pixel in said standard picture and the second corresponding pixel in the reference picture wherein the distance information at the first pixel of said standard picture and the corresponding first pixel of said reference picture is corrected based on distance information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture.

49. A distance calculating apparatus comprising:

a standard picture generating means for generating a standard picture taken of an object;

a reference picture generating means for generating a reference picture taken of said object;

a detecting means for detecting a corresponding pixel of said reference picture corresponding to a pixel of said standard picture based on a evaluation function that indicates an accuracy of correspondence;

a parallax calculating means for calculating parallax information between a pixel of said standard picture and a detected corresponding pixel;

a correcting means for correcting parallax information of a first pixel in said standard picture and a first corresponding pixel in a reference picture when said evaluation function indicates an unreliable accuracy of correspondence using the parallax information of a second pixel in said standard picture and a second corresponding pixel in said reference picture wherein the parallax information at the first pixel of said standard picture and the corresponding first pixel of said reference picture is corrected based on parallax information at a second pixel in the standard picture positioned near the first pixel and a second corresponding pixel in said reference picture, the second pixel in the standard picture and the second pixel in the reference picture exhibiting a highest accuracy of correspondence among a plurality of pixels near said first pixel in said standard picture and said reference picture; and a distance calculating means for calculating a distance to the object based on the corrected parallax information.

\* \* \* \* \*